(12) United States Patent
Kollman

(10) Patent No.: US 8,720,313 B2
(45) Date of Patent: May 13, 2014

(54) WINDOW COVERING CUTTING MACHINE

(75) Inventor: Michael Kollman, Fitchburg, WI (US)

(73) Assignee: Lumino, Inc, Madison, WI (US)

( * ) Notice: Subject to any disclaimer, the term of this patent is extended or adjusted under 35 U.S.C. 154(b) by 1736 days.

(21) Appl. No.: 11/901,506

(22) Filed: Sep. 18, 2007

(65) Prior Publication Data

US 2009/0071307 A1    Mar. 19, 2009

(51) Int. Cl.
*B23D 23/00*    (2006.01)

(52) U.S. Cl.
USPC ................................. 83/196; 83/198

(58) Field of Classification Search
USPC .................................... 83/196, 198
See application file for complete search history.

(56) References Cited

U.S. PATENT DOCUMENTS

| | | | |
|---|---|---|---|
| 2,728,391 A * | 12/1955 | Peddinghaus et al. | 83/198 |
| 5,799,557 A | 9/1998 | Wang | |
| 5,927,172 A | 7/1999 | Wang | |
| 6,196,099 B1 * | 3/2001 | Marocco | 83/197 |
| 6,427,571 B1 | 8/2002 | Hsu | |
| 6,761,099 B2 | 7/2004 | Lin et al. | |
| 7,044,043 B2 * | 5/2006 | Cheng | 83/522.19 |
| 7,118,028 B2 | 10/2006 | Liu et al. | |
| 2002/0029674 A1 * | 3/2002 | Graves et al. | 83/198 |
| 2004/0149104 A1 * | 8/2004 | Jabbari et al. | 83/454 |
| 2006/0123965 A1 | 6/2006 | Cheng | |
| 2006/0156882 A1 * | 7/2006 | Kollman et al. | 83/167 |
| 2007/0000363 A1 * | 1/2007 | Kollman et al. | 83/196 |

* cited by examiner

*Primary Examiner* — Stephen Choi
(74) *Attorney, Agent, or Firm* — Buchanan Ingersoll & Rooney PC

(57) ABSTRACT

A window covering cutting machine is disclosed that has a support table, a cutting mechanism adjacent the support table and a plurality of moveable stops moveably connected to at least one of the cutting mechanism and the support table. The support table has a surface on which at least a portion of a window covering work piece can be placed. The cutting mechanism has a housing with a plurality of openings sized to receive at least a portion of a window covering work piece. The cutting mechanism also has at least one cutting device configured to cut portions of a window covering that extend through any of the openings. One stop is aligned with each opening and is independently moveable relative to the housing and the other stops.

7 Claims, 7 Drawing Sheets

WINDOW COVERING CUTTING MACHINE

FIELD OF INVENTION

The present invention relates to window covering cutting devices.

BACKGROUND OF THE INVENTION

Home centers and other window covering retailers purchase window coverings in stock sizes from blind manufacturers and offer those stock window coverings for sale. Retailers often have cutting machines capable of cutting the stock window coverings. The cutting machines permit the retailer to cut the stock window covering for a customer so it may fit within window openings that have dimensions smaller than the stock window covering. Examples of such cutting machines are disclosed in U.S. Pat. Nos. 5,799,557, 5,927,172, 6,761,099 and U.S. Patent Publication No. 2007/0000363.

A retailer will usually determine the amount of a stock window covering to cut based upon the difference in the dimensions of the stock window covering and the dimensions of the window opening in which the window covering will be mounted. The dimensions of a particular window opening are normally provided by the customer. Once the amount to be cut is determined, the retailer usually aligns the cutting device with a portion of the window covering to ensure the proper amount of the window covering is cut.

If a stop is provided adjacent the cutting device, the retailer may measure the distance between the cutting device and the location of the stop to ensure the correct amount is cut. The portion of the window covering to be cut is positioned adjacent the cutting device so that an end of the window covering contacts the stop. The cutting device is then actuated to cut that portion of the window covering.

Some cutting machines have a housing with multiple sets of openings for receiving different types of window coverings. One set of openings is typically sized and configured to receive the metal headrail, slats, and bottomrail portions of venetian blinds. Another set of openings is usually sized and configured to receive vinyl headrail, pleated or cellular material, and bottomrail portions of a pleated or cellular shade. Different cutting devices are often aligned with those different sets of openings.

On occasion, a retailer may mistakenly place a venetian blind with a metal headrail into openings for the pleated or cellular shade having a vinyl headrail. Should this occur, the blade selected to cut vinyl can be damaged when it cuts the metal headrail. Similar mistakes can occur for openings sized to receive other types of window coverings and can result in damage to the cutting blade or damage to the window covering.

When a blade or window covering is damaged, the retailer orders a replacement from the manufacturer of the cutting machine. Typically, the retailer does not explain how the blade was damaged. Indeed, a sales associate who damages the blade by using the wrong openings may not tell his or her supervisor of the mistake. As a result, manufacturers of blind cutting machines have failed to recognize or appreciate the problem. Yet, this problem can cause the retailer to incur significant costs in replacing blades and window coverings.

There is a need for a window covering cutting machine that is capable of preventing a user from mistakenly cutting a window covering with the wrong cutting device.

SUMMARY OF THE INVENTION

I provide a window covering cutting machine that includes a support table, a cutting mechanism and a plurality of independently moveable stops. The support table has a surface on which at least a portion of a window covering work piece can be placed. The cutting mechanism is adjacent the support table. The cutting mechanism has a housing with a plurality of openings sized to receive at least a portion of a window covering work piece and one or more cutting devices configured to cut portions of a window covering that extend through any of the openings. The plurality of stops is moveably connected to at least one of the housing and the support table. One stop is aligned with each opening. Each of the stops is independently moveable relative to the housing and other stops. Each cutting device may be a die or a blade.

Each stop may be moveable from a closed position to a plurality of open positions. Each stop can prevent a work piece from extending through the opening aligned with that stop when that stop is in the closed position. When a stop is in the open position, at least a portion of the work piece should be able to extend through the opening aligned with that stop.

The cutting machine can also include a controller that is operatively connected to the cutting mechanism and the plurality of stops. The controller can be configured to cause at least one of the stops to move based on at least one user input received by the controller. In some embodiments, the user input may identify a window covering to be cut by the cutting machine and the controller can cause one or more of the stops to move based on the input.

The controller may move the stops so that one stop is in the open position and the other stops are in the closed position. It should be understood that such an alignment of stops can prevent a user from mistakenly inserting the window covering work piece through the wrong openings.

In one embodiment, one or more user inputs can provide sufficient information to the controller so the controller can determine an amount to be cut and cause one of the stops to move to an open position. The stop moved to the open position is located a distance away from the opening or openings with which that stop is aligned. The distance corresponds with the amount to be cut.

The plurality of openings of the housing can be located in various configurations. For example, the openings may be arranged into four sets of apertures. Each set of apertures may have one or more apertures within that set. The first set of apertures can include one aperture. The second set of apertures can have three apertures in vertical or horizontal alignment. The third set of apertures can also have three apertures in vertical or horizontal alignment. The fourth set of apertures may have two apertures in vertical or horizontal alignment.

In some embodiments, the first set of apertures is sized and configured to receive slats from vertical blinds, the second set is sized and configured to receive headrail, window covering material and bottomrail portions of blinds having metal slats, the third set is sized and configured to receive headrail, window covering material and bottomrail portions of blinds having vinyl slats, and the fourth set is sized and configured to receive headrail and window covering material and portions of a vinyl bottomrail.

In other embodiments of my invention, the window covering cutting machine can be configured to have one or more cutting devices prevent a work piece from being mistakenly inserted through one or more openings in the housing of the cutting mechanism. The cutting mechanism for such embodiments has a housing with a plurality of openings sized to receive at least a portion of the window covering work piece and one or more cutting devices. Each cutting device is aligned with at least one respective opening of the plurality of openings and is configured to move from a closed position to an open position. When a cutting device is in the closed position, that cutting device prevents a portion of the window covering work piece from extending through the one or more openings to which that cutting device is aligned. When a cutting device is in the open position, at least a portion of a window covering work piece may extend through the one or more openings with which that cutting device is aligned. The cutting mechanism is configured so that each cutting device not used to cut a window covering work piece is in the closed position while the cutting device that will be used is moved to its open position. Each cutting device is maintained in the closed position after the cutting mechanism is finished cutting the window covering work piece. There can be one independent cutting device for each aperture or one structure that contains one or more cutting devices.

Often two opposite ends of a work piece must be cut to cut down a window covering work piece. It should be appreciated that the cutting mechanism may not be finished cutting a window covering work piece until both ends of the work piece have been cut by the cutting mechanism. When cutting work pieces that require only one end to be cut by the cutting mechanism, the cutting mechanism may be finished cutting the work piece after a cutting pass has been made that cuts the end of that work piece.

A controller may be operatively connected to the cutting mechanism such that the controller moves the cutting devices. The controller may move one or more cutting devices from the closed position to the open position based on one or more user inputs received by the controller. For example, a work piece may be scanned by a scanner connected to the controller that provides user input to the controller that identifies the work piece to be cut by the cutting machine. The controller will move the cutting device or cutting devices aligned with the openings for that type of work piece in the cutting mechanism to the open position and, if necessary, move any other cutting devices to the closed position to prevent a sales associate from mistakenly inserting the work piece through the wrong set of openings.

In some embodiments, the controller may be configured to only move one cutting device to that cutting device's open position and move or maintain the other cutting devices in their respective closed positions.

In yet other embodiments of my window covering cutting machine, the cutting mechanism of the window covering cutting machine can include a housing that has a first opening sized to receive at least a portion of a window covering work piece and a cutting device sized and configured to move adjacent the housing from a default position to a first position. The cutting device blocks the first opening when in the default position and exposes the first opening when in the first position so that at least a portion of the window covering work piece can extend through the first opening.

The housing may further include at least one of a second opening and a third opening. For such embodiments, the cutting device may be configured to move to various other positions so that the cutting device blocks all but one opening or set of openings. For example, for embodiments that have a housing with a first, second and third opening, the cutting device may be configured to move from a default position, to a first position, a second position, or a third position. When in the default position, the cutting device may block the first opening, second opening and third opening. In the first position, the cutting device may block the second and third openings, but expose the first opening. In the second position, the cutting device may block the first and third openings and expose the second opening. In the third position, the cutting device may block the first and second openings, but expose the third opening. It should be appreciated that the cutting device can be configured to be maintained at its default position after the cutting mechanism is finished cutting the window covering or window covering work piece. Maintaining the cutting device in its default position prevents a user from mistakenly inserting a work piece to be cut by the cutting machine into the wrong opening and being cut by the wrong blade or other cutting device.

Other details, objects, and advantages of the invention will become apparent as the following description of certain present preferred embodiments thereof proceeds.

BRIEF DESCRIPTION OF THE DRAWINGS

In the accompanying drawings I have shown certain present preferred embodiments of my window covering cutting machine in which.

DETAILED DESCRIPTION OF PRESENT PREFERRED EMBODIMENTS

Figure 1:
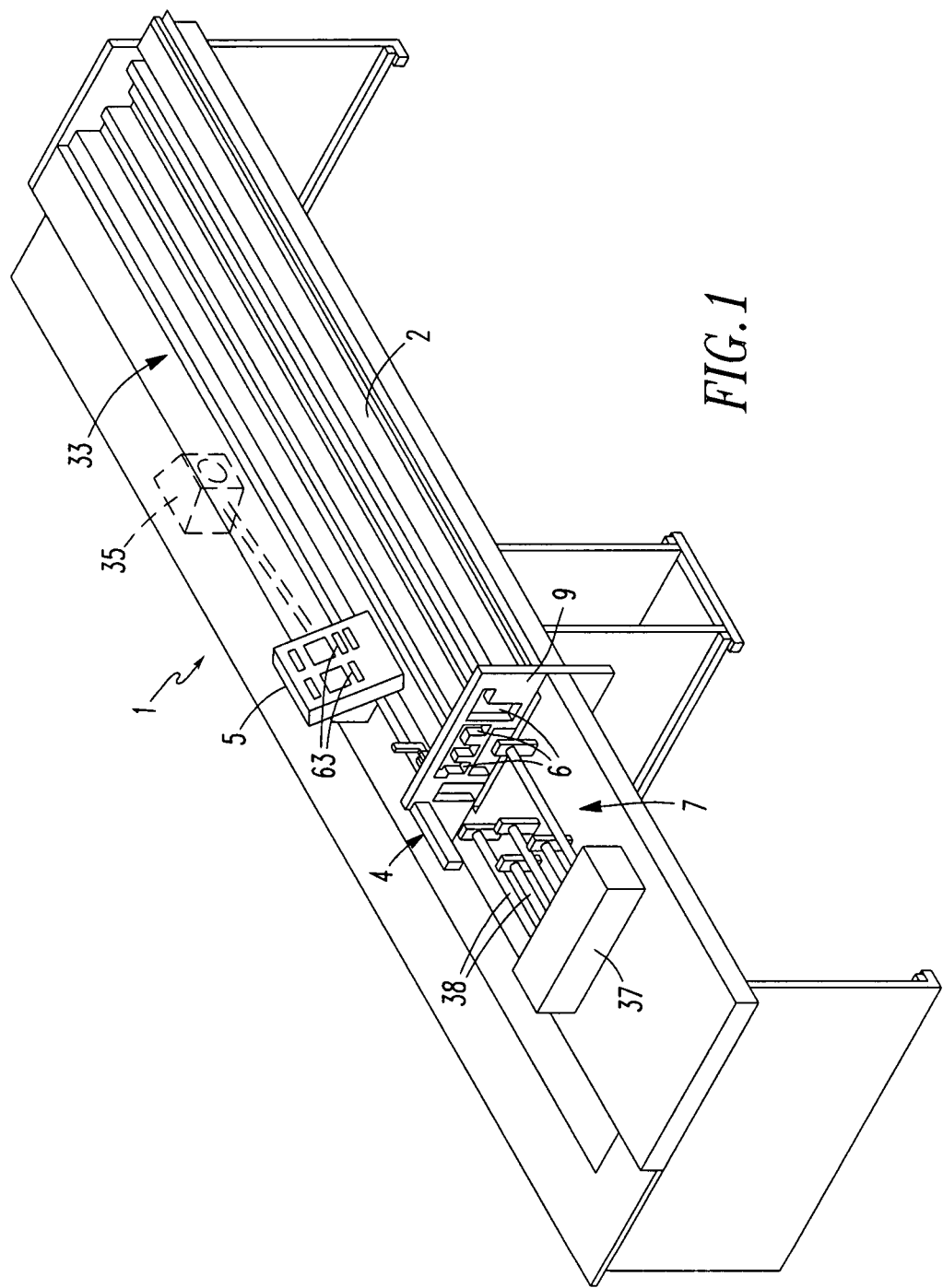
FIG. 1 is a perspective view of a first present preferred embodiment of my window covering cutting machine.

One embodiment 1 of my window covering cutting machine is shown in FIG. 1. The machine has a support table 33 with a surface 2 that is configured to support at least a portion of a window covering. A cutting mechanism 4 is adjacent the support surface 2. The cutting mechanism 4 has a housing 9 that has a plurality of openings 6. The openings 6 are sized and configured to receive portions of a window covering or window covering work piece such as a venetian blind, a pleated shade, a cellular shade or vertical blind slats. The cutting mechanism 4 also has cutting devices that are configured to cut portions of a window covering work piece that extends from the support surface 2 through one or more of the openings 6. A plurality of stops 7 are moveably connected to the support table 33 and are adjacent the housing 9. Each stop is aligned with one or more respective openings 6 and is independently moveable relative to the housing 9 and the other stops.

The stops move along paths aligned with respective openings from a closed position to multiple open positions. The stops may be positioned by extendable arms 38 that extend from one or more hydraulic cylinders 37. The hydraulic cylinders 37 can be manipulated so that arms 38 extend or retract to position the stops. Of course, other mechanisms may also be used to move the stops from their closed positions to various open positions. For example, the stops can be attached to belts or movable racks that define the paths and move to position the stops.

Each stop's closed position is located adjacent a respective opening or set of openings. When a stop is in the closed position, a portion of a window covering may not be inserted through the one or more openings with which that stop is aligned. Consequently, a sales associate cannot cut a window covering at that set of openings. When a stop is in an open position, at least a portion of a window covering may be inserted through the one or more openings 6 is aligned with that stop.

Preferably, the various open positions of the stops are located at distances away from the openings 6 that correspond with the amount different window coverings are to be cut by the cutting mechanism 4. For example, if a user intends to cut 1 inch from a portion of a window covering, one or more stops may be moved a distance away from the openings configured to receive that window covering so that only 1 inch of the window covering may extend sufficiently past the openings and be cut by the cutting mechanism 4.

A controller 5 can be operatively connected to the cutting mechanism 4 and the plurality of stops 7. The controller 5 is configured to cause at least one of the stops to move based on a user input received by the controller. The user input may include data entered into the controller by a user that presses buttons 63 on the controller. Such data can include the dimensions of a customer's window opening a window covering may be mounted to, the dimensions of the window covering, or the amount of the window covering to be cut by the cutting machine 1.

The user input received by the controller 5 can also include information obtained from a scanner 35, which is illustrated by dotted lines in FIG. 1. The scanner 35 may be configured to read UPC symbols, radio frequency identification devices, tags or labels and transmit the information obtained from the scanned symbol, device, tag or label to the controller. Such information can include the dimensions of the scanned window covering, the type or style of the scanned window covering or other information pertinent to determining how much of the scanned window covering may need to be cut for it to fit within a particular window opening.

I prefer to configure the controller so the controller moves the stops to ensure that only stops aligned with one set of openings are moved to an open position after the controller receives the user input. The controller moves the stop or stops to the open position that are aligned with the set of openings that correspond with the window covering that is to be cut. The controller causes the other stops to move to their closed position. When in their closed position, the stops prevent a user from mistakenly cutting a window covering with the wrong cutting device.

The user input can provide the controller with sufficient information for the controller to determine the amount a window covering is required to be cut and cause one or more of the stops to move to an open position that corresponds to that amount while moving the other stops to their closed positions. Often, window coverings are cut on both ends to cut the blind down to a desired width. Typically, one end of the blind is cut, then the opposite end of the blind is inserted into the same openings and cut.

Figure 2:
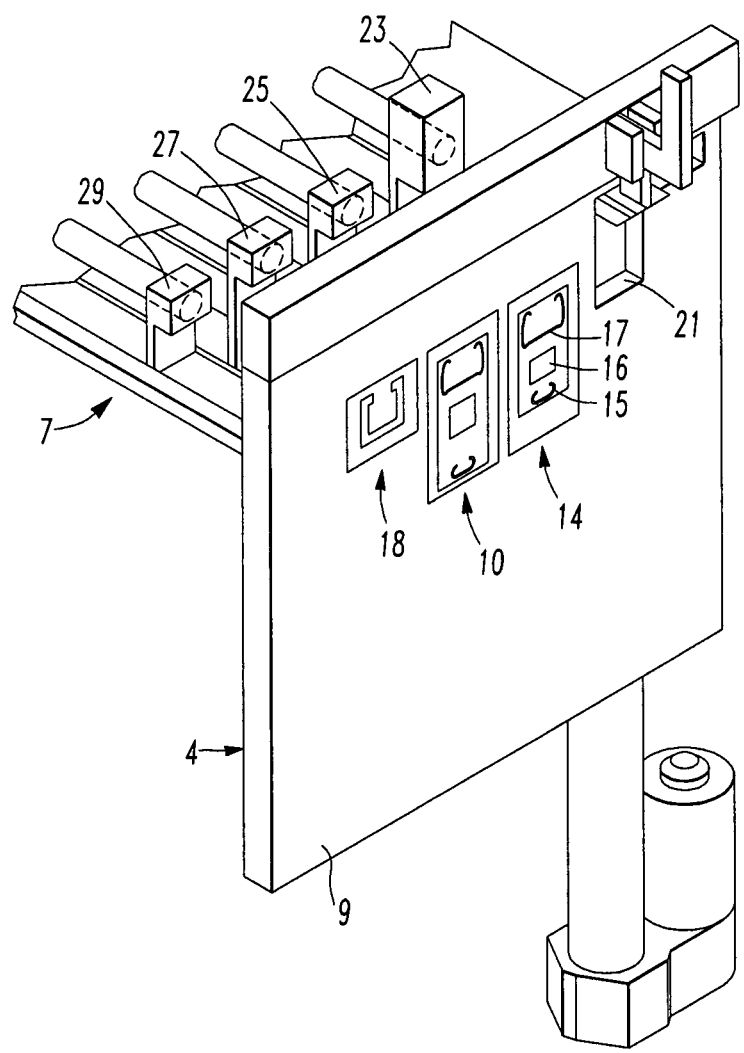
FIG. 2 is a fragmentary view of the first present preferred embodiment illustrating the housing and independently moveable stops with the hydraulic cylinder and arms.

Referring to FIG. 2, the stops 7 include a stop 23 aligned with a first set of apertures 21 sized and configured to receive slats from a vertical blind, a stop 25 aligned with a set of apertures 14 sized and configured to receive a cellular or pleated shade, a stop 27 aligned with a set of apertures 10 sized and configured to receive portions of a venetian blind having a metal headrail and a metal bottomrail and a stop 29 aligned with a set of apertures 18 sized and configured to receive the headrail of a vertical blind.

Figure 3:
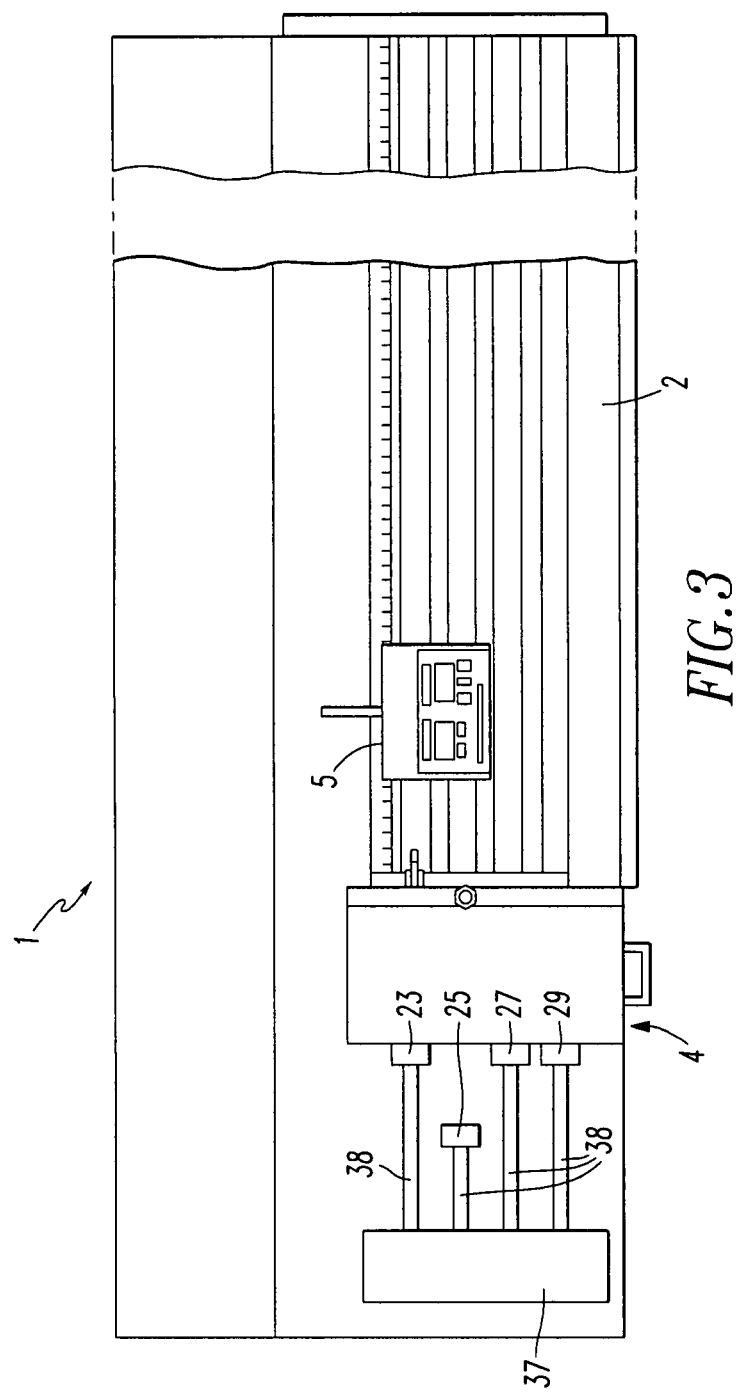
FIG. 3 is a top view of the first present preferred embodiment showing three stops in their closed positions and one stop in an open position.
Figure 4:
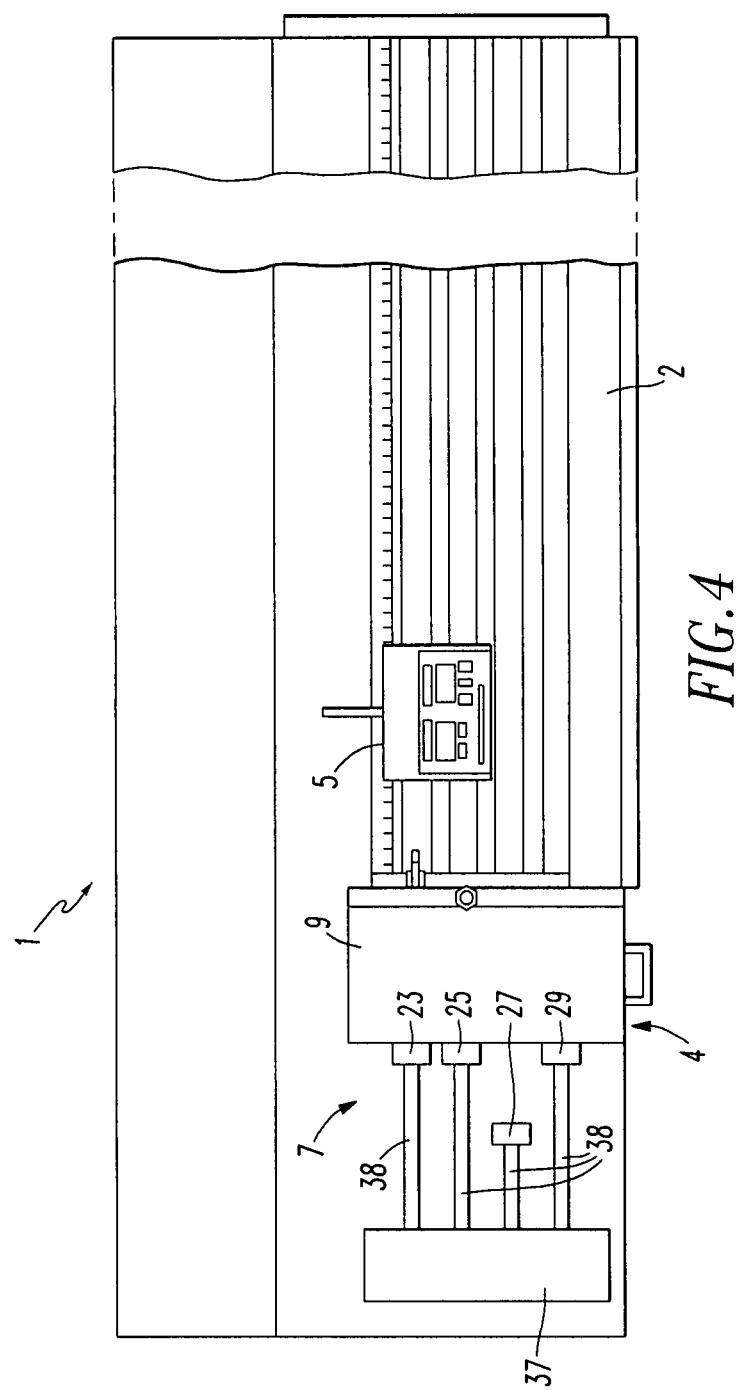
FIG. 4 is a view similar to FIG. 3 illustrating a different stop in an open position and the other stops in their closed position.

If a user provides user input to controller 5 that indicates a cellular shade is to be cut down by one inch, the controller may move stops 23, 27 and 29 to their closed positions and stop 25 to an open position, as shown in FIG. 3. The open position of stop 25 is spaced sufficiently from the housing 9 and the openings to permit 0.5 inches of the portion of the window covering inserted through apertures 15, 16 and 17 to be cut by the cutting mechanism 4. A user will then insert one end of the window covering through apertures 15, 16, 17 and cut the first end of the window covering. Thereafter, the user will insert the opposite end of the window covering through the apertures 15, 16 and 17 and cut the second end of the window covering so that the window covering will be cut down by 1 inch.

Similarly, if a user provides user input to controller 5 that indicates a metal slatted blind is to be cut down by one inch, the controller will cause stop 27 to move to an open position and the other stops to move to their closed positions. Preferably, stop 27 will be moved a distance from set of apertures 10 that corresponds with the amount of the blind to be cut and the user will use the machine 1 to cut each end of the blind by 0.5 inches to cut the blind down by one inch.

Of course, the controller can also be configured to move the stops so that only one end of the blind is cut by an amount. For example, when a user input identifies a vertical blind is to be cut down by 2 inches, the controller may move stop 23 to an open position that corresponds with that full 2 inch length because only one end of vertical blinds are typically cut to cut the blind down to a desired dimension.

Other embodiments of my cutting machine may use the blades of the cutting mechanism or part of the body of the cutting device to provide some of the functionality provided by the stops in the first embodiment. It should be understood that one or more end stops may not be included with such embodiments.

Figure 5:
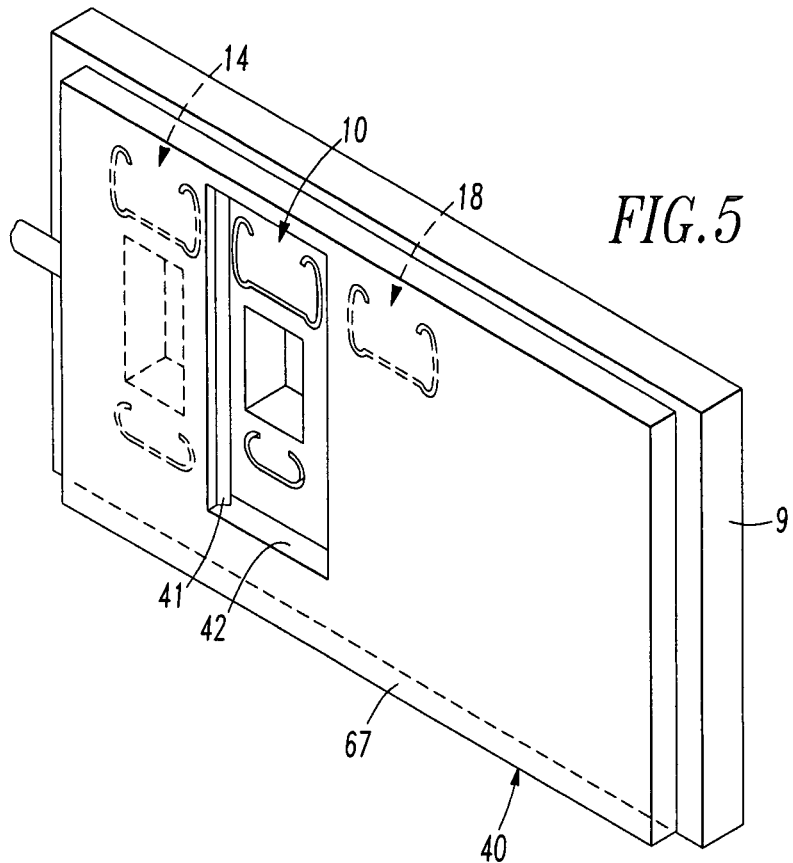
FIG. 5 is a rear view of a portion of a second present preferred embodiment illustrating an embodiment of the cutting mechanism having the cutting device in a first position.
Figure 6:
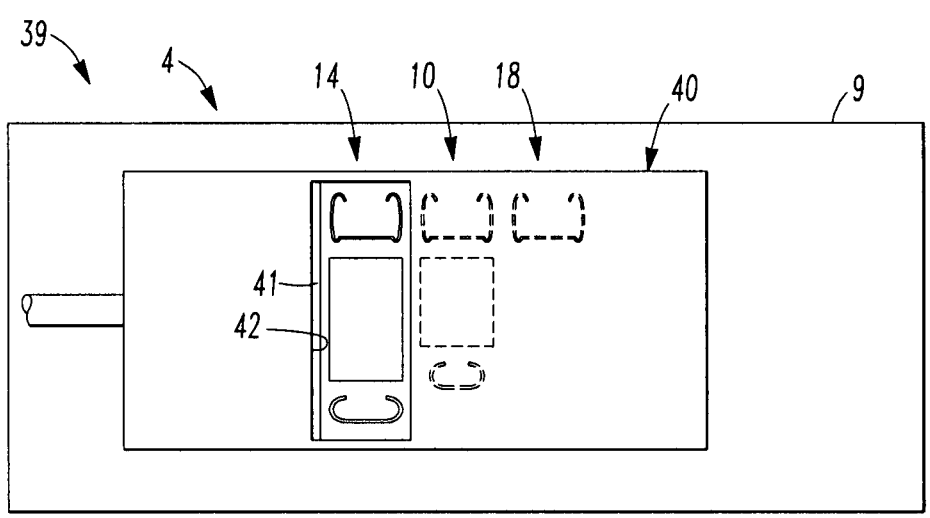
FIG. 6 is a fragmentary view of the second present preferred embodiment illustrating the cutting device in the second position.
Figure 7:
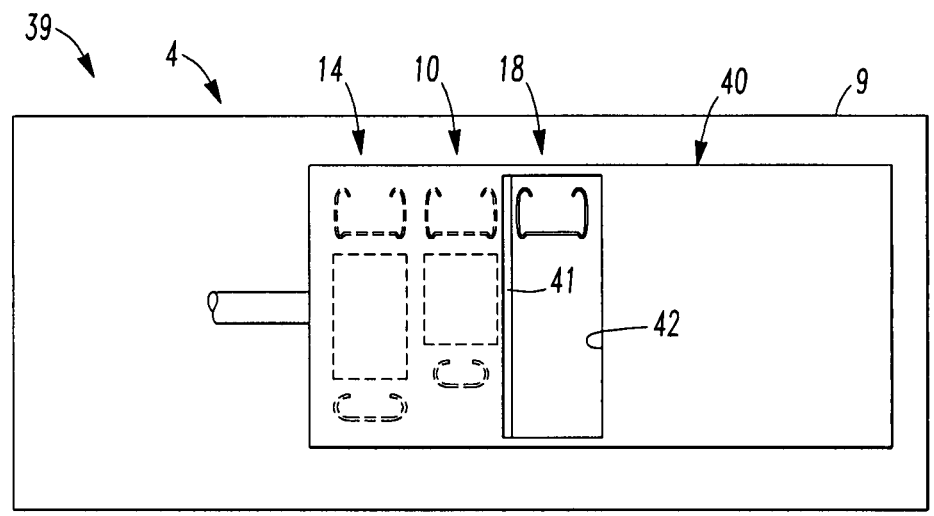
FIG. 7 is a view similar to FIG. 6 illustrating the cutting device in the third position.

Referring to FIGS. 5, 6 and 7, an embodiment of my cutting machine 39 has a cutting mechanism 4 that has a housing 9 with sets of openings 10, 14, 18 and cutting device 40, which has a blade 41 adjacent an opening 42 that is sized and configured for alignment with each set of openings 10, 14, 18. The cutting device 40 is configured to move from a first position to various other positions prior to being actuated to make a cutting pass to cut a window covering or a window covering work piece that may extend through a set of openings with blade 41.

For example, cutting device 40 may move from the first position shown in FIG. 5 to a second position shown in FIG. 6 or a third position shown in FIG. 7 prior to being actuated to cut a portion of a window covering work piece. When a blade is in the first position, a portion of a work piece may extend through set of openings 10 aligned with blade 41 and opening 42. It should be appreciated that the cutting device 40 is sized and configured to block set of openings 14 and 18 so that a window covering work piece cannot be mistakenly cut by the cutting device when the cutting device is in the first position. When the cutting device is moved to the second position shown in FIG. 6, the cutting device 40 blocks set of openings 10 and 18 and exposes set of openings 14. Similarly, when the cutting device is moved to the third position, the cutting device 40 blocks set of openings 10 and 14 and exposes set of openings 18.

Figure 8:
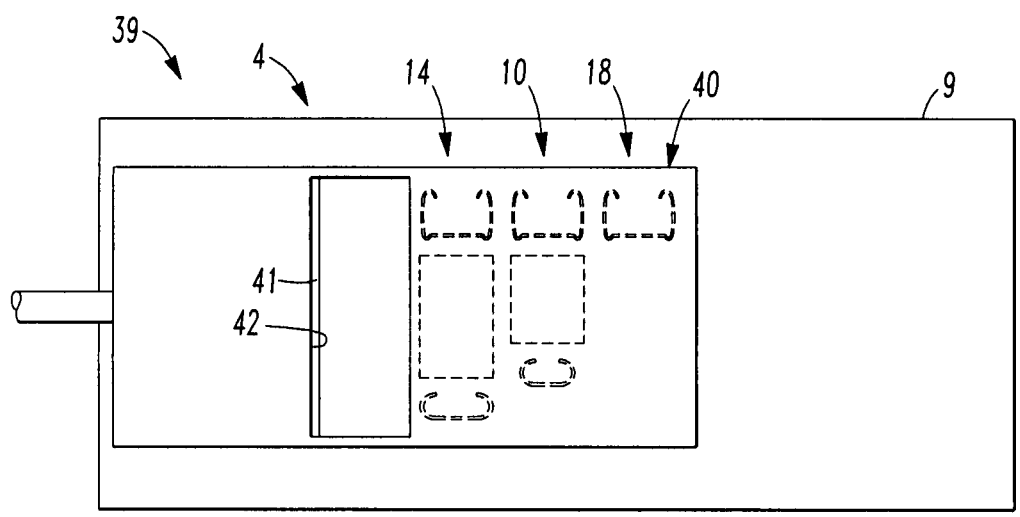
FIG. 8 is a view similar to FIGS. 6 and 7 illustrating the cutting device in the default position.

The cutting device 40 also has a default position that permits the body of the cutting device to block all sets of openings 10, 14 and 18, a shown in FIG. 8. The cutting mechanism is configured so the cutting device 40 is at the default position until a user provides user input to a controller that identifies a window covering or window covering work piece to be cut by the cutting machine. After the window covering work piece is cut by the cutting mechanism, the cutting device returns to the default position. Maintaining the cutting device at the default position prevents a user from mistakenly inserting a work piece through an opening and cutting the work piece with the wrong cutting device.

Preferably, a controller is connected to the cutting mechanism 4 and is configured to move the cutting device 40. User inputs may be provided to the controller by buttons on the controller, a scanner connected to the controller or other information collection or information storage devices connected to the controller. Preferably, a user input identifies the window covering work piece to be cut by the window covering cutting machine. Based on the user input received by the controller, the cutting device will move to expose the set of openings used to cut that work piece and block the other sets of openings to prevent a user from mistakenly using the wrong set of openings to cut a work piece. For example, if the user input identifies an aluminum venetian blind to be cut by the cutting mechanism, the controller causes cutting device 40 to move to its first position, which exposes set of openings 10 and blocks set of openings 14 and 18. A sales associate may then insert the work piece through set of openings 10 and actuate the cutting device 40 so blade 41 makes a cutting pass and cuts the portion of the aluminum venetian blind that extends through the set of openings 10.

It should be appreciated that the cutting mechanism may be finished cutting a window covering work piece after one cutting pass or after multiple cutting passes have been made by the cutting device. For example, if a work piece that only requires one cutting pass to be made to cut the work piece down to a required dimension is needed, the cutting mechanism is finished cutting the work piece after one cutting pass has been made with the blade 41 of the cutting device.

In the event multiple cutting passes are required to properly cut down a window covering or window covering work piece, the cutting mechanism 4 may be configured so that it is not finished cutting the work piece until finishing those multiple cutting passes. For example, the cutting down of a stock blind to fit within a customer's window opening usually requires that the blind be cut at two opposite ends to ensure the blind properly fits within the customer's window opening. For cutting such a blind, the cutting mechanism may not be finished cutting the blind until after both ends of the blind were cut by the cutting mechanism.

It should be understood that cutting device 40 may be configured to have multiple blades. For such embodiments, each blade may be positioned in the body 67 of the cutting device so that each blade only aligns with one respective set of openings when the cutting device is moved from the default position to a particular position. The cutting device and blades are sized and configured so that when it the cutting device is moved to a position that does not align a blade with its respective set of openings, the body of the cutting device blocks that set of openings.

Figure 9:
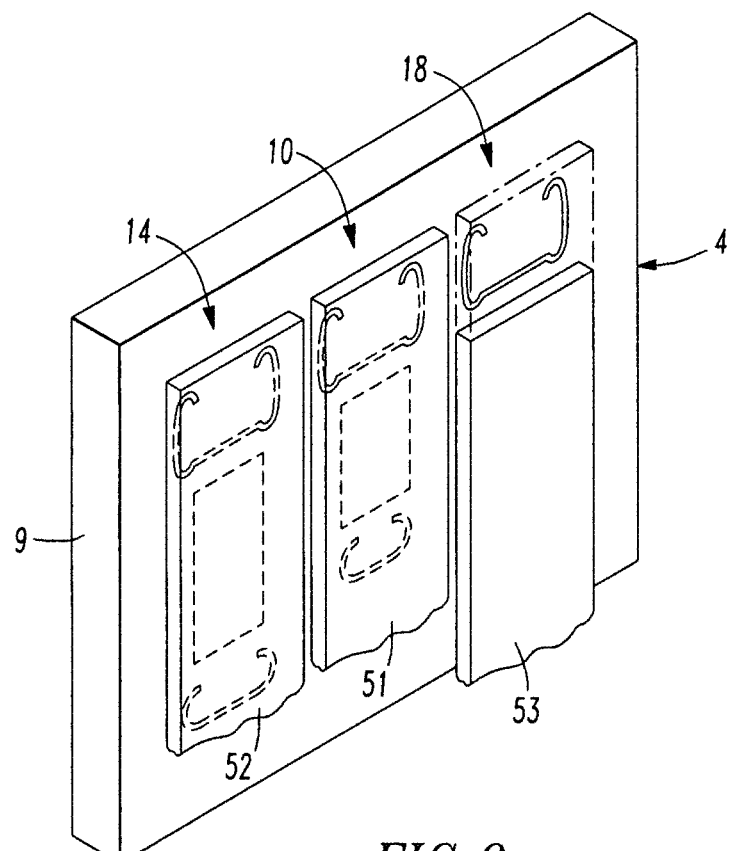
FIG. 9 is a rear view of a portion of a third present preferred embodiment with two blades in their closed position and one blade in its open position.

As shown in FIG. 9, a third embodiment of my cutting machine has a cutting mechanism 4 that has blades 51, 52 and 53 aligned with respective set of openings 10, 14 and 18. The blades 51, 52 and 53 are configured to move from a closed position to an open position prior to cutting a portion of a window covering or a window covering work piece that may extend through the openings aligned with that blade.

As illustrated in FIG. 8, blades 51 and 52 are in their closed position and blade 53 is in its open position. Blade 53 may move from its open position to its closed position, which is shown by dotted line in FIG. 9, to cut a portion of a headrail. After a window covering work piece has been cut by blade 53, blade 53 is maintained in its closed position.

The cutting mechanism may also be configured to move blade 51 or blade 52 to their closed position in the event one or both of those blades were not at their closed position prior to attempting to cut down the headrail. Such movement of non-used blades 51 and 52 may occur prior to or at the same time blade 53 is moved to its open position.

It should be understood that when a blade is in an open position, at least a portion of a window covering work piece may extend through the opening or openings aligned with that blade. When a blade is in the closed position, a window covering work piece is blocked from extending through the opening or openings aligned with that blade. Such movement of the blades not used to cut a work piece to their closed position can prevent a sales associate from mistakenly cutting the work piece with the wrong blade.

Preferably, a controller is connected to the cutting mechanism 4 and is configured to move the blades from their closed position to their open position. User inputs may be provided to the controller that can identify the window covering work piece to be cut by the window covering cutting machine. Based on the user input received by the controller, the blade used to cut that work piece will be moved to its open position and the other blades will be kept at their closed position or, if necessary, moved to their closed position.

It should be appreciated that the closed position of each blade or cutting device does not have to be the position at which the blade ultimately stops when cutting a portion of the work piece. For example, it is contemplated that the closed position can be a position located along the cutting path that the blade moves along to cut a work piece that is adjacent to the position at which the blade ultimately stops at after cutting a window covering work piece. Such a closed position should position the blade adjacent the opening or openings such that a sales associates or other user is prevented from inserting a window covering work piece through the openings aligned with that blade.

Of course, embodiments of my cutting machine can be configured to cut down all kinds of window coverings including vertical blinds, metal slatted blinds, venetian blinds having metal, vinyl or faux wood slats, pleated shades, cellular shades and shutters.

While I have shown and described certain present preferred embodiments of my window covering cutting machine and have illustrated certain present preferred methods of making and using the same, it is to be distinctly understood that the invention is not limited thereto but may be otherwise variously embodied and practiced within the scope of the following claims.

I claim:

1. A window covering cutting machine comprised of:
a support table having a surface on which at least a portion of a window covering work piece to be cut is placeable;
a cutting mechanism adjacent to the support table, the cutting mechanism comprising a housing having a plurality of openings sized to receive at least a portion of a window covering work piece and at least one cutting device, each cutting device aligned with at least one respective opening, each cutting device configured to move from a closed position to an open position such that each cutting device prevents a window covering work piece from extending through the at least one opening aligned with that cutting device when that cutting device is in the closed position and a portion of the work piece is able to extend through the at least one opening aligned with that cutting device when that cutting device is in the open position, the cutting mechanism configured such that each cutting device not used to cut the window covering work piece to be cut is in the closed position, each cutting device maintained in the closed position after the cutting mechanism is finished cutting the window covering work piece; and a controller operatively connected to the cutting mechanism, wherein the controller is configured to move the at least one cutting device from the closed position to the open position based on at least one user input received by the controller.

2. The window covering cutting machine of claim 1 wherein the at least one user input identifies the window covering work piece to be cut by the window covering cutting machine.

3. The window covering cutting machine of claim 1 wherein the at least one cutting device is a plurality of cutting devices and the controller is configured to only move one cutting device of the plurality of cutting devices from the closed position to the open position and all other cutting devices of the plurality of cutting devices are moved or kept in the closed position when the at least one cutting device of the plurality of cutting devices is moved to the open position.

4. A window covering cutting machine comprising:
a support table having a surface on which at least a portion of a window covering work piece to be cut is placeable;
a cutting mechanism adjacent to the support table, the cutting mechanism comprising a housing having a first opening sized to receive at least a portion of the window covering work piece and a cutting device sized and configured to move adjacent the housing from a default position to a first position, the cutting device blocking the first opening when the cutting device is in the default position, the first opening being exposed when the cutting device is in the first position such that at least a portion of the window covering work piece can extend through the first opening, the cutting device being maintained in the default position after the cutting mechanism is finished cutting the window covering work piece;

wherein the cutting device is configured to move to a second position and the housing is further comprised of a second opening sized and configured to receive at least a portion of the window covering work piece, the second opening aligned with the first opening such that the second opening is exposed when the cutting device is in the second position and the second opening is blocked by the cutting device when the cutting device is in the first position or the default position;

wherein the housing is further comprised of a third opening sized and configured to receive at least a portion of the window covering work piece and wherein the cutting device is moveable to a third position, the third opening aligned with the first opening and the second opening such that the third opening is exposed so that a portion of the window covering work piece can extend through the third opening when the cutting device is in the third position and the first opening and the second opening are blocked by the cutting device when the cutting device is in the third position, the third opening being blocked by the cutting device when the cutting device is in the default position, first position or second position; and a controller operatively connected to the cutting mechanism the controller being configured to cause the cutting device to move based on at least one user input received by the controller, wherein the controller is configured to move the cutting device based on at least one user input received by the controller.

5. The window covering cutting machine of claim 4 wherein the at least one user input identifies a window covering to be cut by the window covering cutting machine and the controller causes the cutting device to move based on the at least one user input.

6. The window covering cutting machine of claim 4 wherein the controller causes the cutting device to move from the default position to one of the first position, second position and third position based on the at least one user input.

7. The window covering of claim 6 wherein the controller causes the cutting device to move to the default position after the cutting device has made a cutting pass to cut the window covering work piece.

* * * * *